United States Patent [19]

Branson

[11] Patent Number: 4,756,628
[45] Date of Patent: Jul. 12, 1988

[54] RECLOSABLE FLEXIBLE CONTAINER HAVING A DOWNWARDLY DEPENDING CUFF

[75] Inventor: Mark Branson, Shelbyville, Ind.
[73] Assignee: KCL Corporation, Shelbyville, Ind.
[21] Appl. No.: 940,003
[22] Filed: Dec. 10, 1986

Related U.S. Application Data

[63] Continuation-in-part of Ser. No. 796,632, Nov. 8, 1985, abandoned.

[51] Int. Cl.$^4$ ............................................. B65D 33/24
[52] U.S. Cl. ...................................... 383/63; 383/87; 383/120
[58] Field of Search .................. 383/35, 50, 54, 57, 383/62, 63, 65, 98, 99, 114, 120, 64, 81, 86, 87, 84

[56] References Cited

U.S. PATENT DOCUMENTS

| | | | |
|---|---|---|---|
| 2,514,750 | 7/1950 | Dobbs et al. | 383/64 |
| 3,164,186 | 1/1965 | Weber et al. | 383/63 X |
| 3,346,883 | 10/1967 | Ersek | 383/63 X |
| 3,371,696 | 3/1968 | Ausnit | 383/35 |
| 3,381,592 | 5/1968 | Ravel | 383/63 |
| 3,410,327 | 11/1968 | Ausnit | 383/65 |
| 3,416,585 | 12/1968 | Staller | 383/65 |
| 3,827,472 | 8/1974 | Uramoto | 383/63 X |
| 3,948,705 | 4/1976 | Ausnit | 383/63 |
| 4,317,478 | 3/1982 | Babbidge | 383/35 X |

FOREIGN PATENT DOCUMENTS

| | | | |
|---|---|---|---|
| 0090167 | 3/1961 | Denmark | 383/81 |
| 1476709 | 4/1967 | France | 383/63 |
| 2332191 | 6/1977 | France | 383/63 |
| 0098822 | 10/1961 | Norway | 383/81 |
| 0287845 | 4/1953 | Switzerland | 383/64 |

Primary Examiner—Stephen Marcus
Assistant Examiner—Bryon Gehman
Attorney, Agent, or Firm—Robert S. Beiser

[57] ABSTRACT

A reclosable flexible container is provided as a pouch having front and back walls and a pouch opening at the upper edge thereof. The pouch has a cuff about the periphery of the pouch opening. A first fastener profile is affixed to either the cuff or the front wall of the pouch. A second fastener profile is affixed to the rear wall or to a cuff affixed to the rear wall. The fastener profiles may be selectively interlocked so as to seal the pouch with at least one wall of the pouch being interposed therebetween and engaged therein.

14 Claims, 3 Drawing Sheets

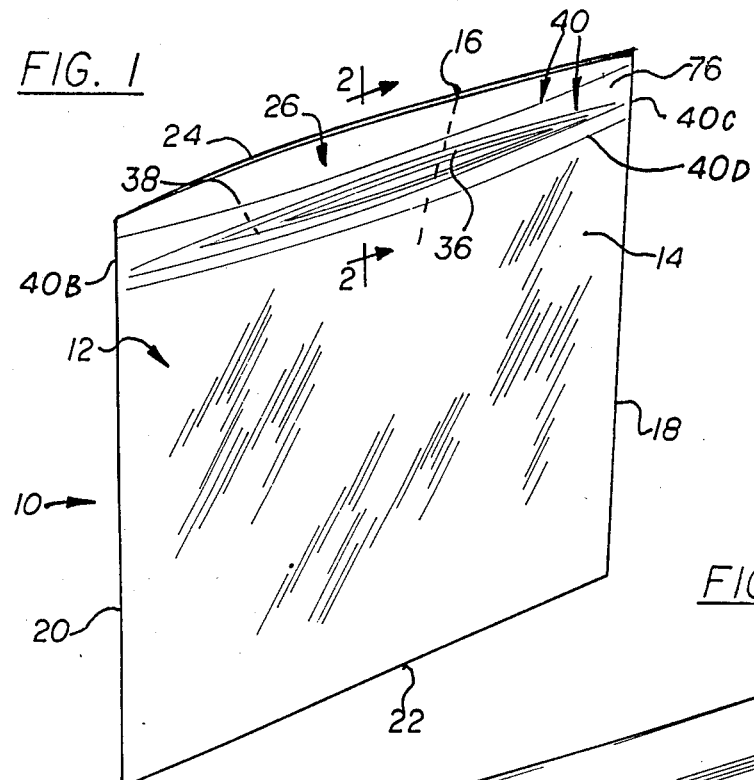
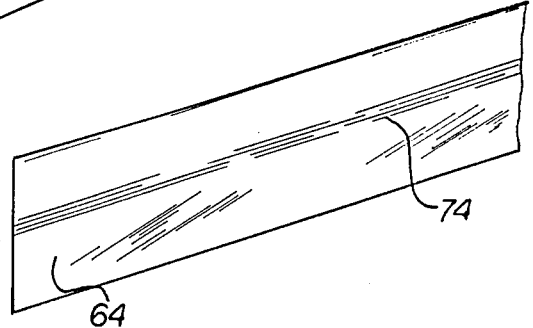
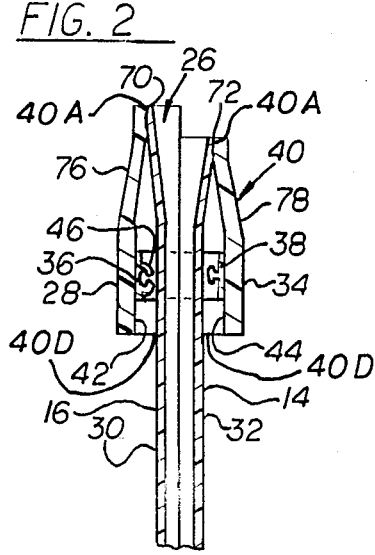
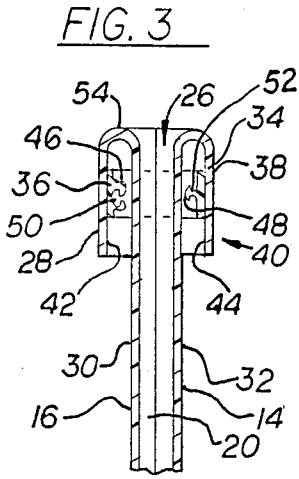

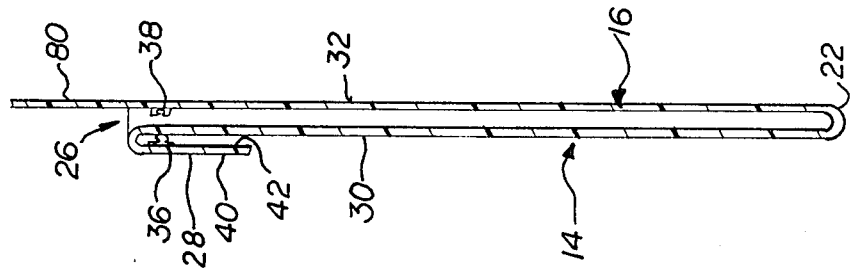
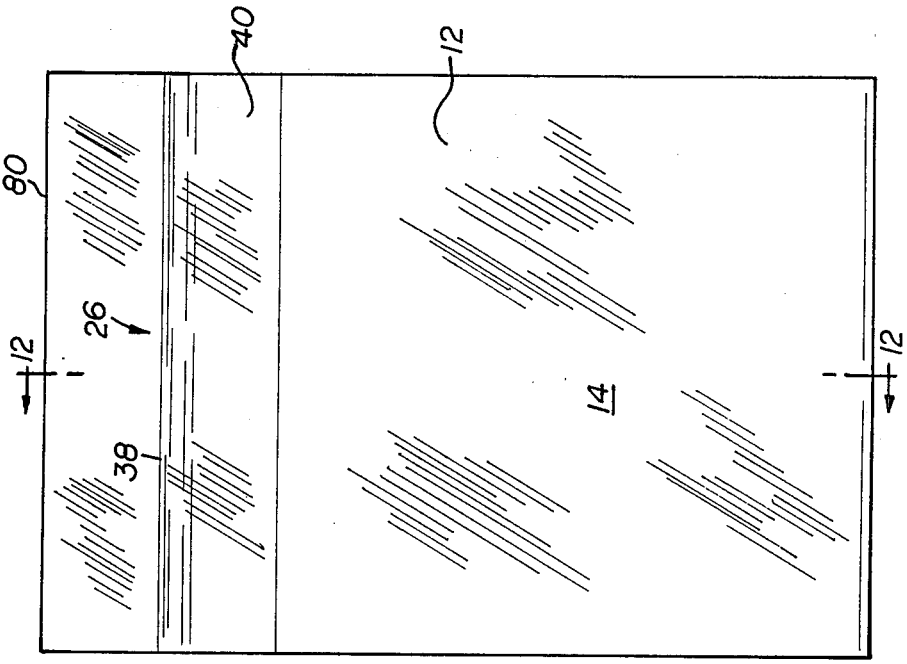
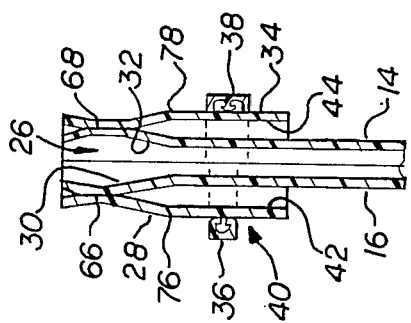

RECLOSABLE FLEXIBLE CONTAINER HAVING A DOWNWARDLY DEPENDING CUFF

This application is a continuation-in-part of U.S. patent application Ser. No. 796,632, Reclosable Flexible Container, filed Nov. 8, 1985, now abandoned.

BACKGROUND OF THE INVENTION

The present invention relates generally to reclosable flexible containers and in particular to reclosable flexible containers having continuous fastener profiles affixed to the exterior of the container.

In the manufacture of reclosable plastic bags, bags are usually formed with a folded bottom edge and with side edges sealed to each other about their periphery. Flexible reclosable fastener strips are usually sealed inside the bag near the bag opening. The bag bodies are formed of a thin, lightweight plastic film which is extruded separately from the fastener. The fastener strips are extruded with a process that provides interlocking rib and groove elements carefully shaped and sized so that they will interlock when pressed together and will separate when pulled apart. These fastener strips have webbed portions which are sealed to the inside of the bag. Alternatively, continuous fastener profiles may be integrally formed in the plastic film as seen in U.S. Pat. No. Re. 28,959, Naito. However, problems have appeared in the past in the sealing of fastener strips to the inside of the bag walls. Further, it has been found that forming the fastener strips integrally with the bag walls tends to reduce the speed of manufacture.

It has been known in the past to join sheets of plastic film utilizing clamps or fasteners which grip multiple layers of plastic film from the outside. An example is U.S. Pat. No. 3,893,212, Curry. However, despite a wide variety of configurations of reclosable fastener containers found in the prior art, the use of flexible continuous fastener strips sealed to the exterior of reclosable flexible containers which interlock through the walls of the container and do not inadvertently open, has not been shown. The use of flexible fastener strips sealed to the outside of the container makes possible wide spread utilization of the present invention in commercial applications such as food storage bags.

Accordingly, it is an object of the present invention to provide improved flexible reclosable containers without the need for a continuous accurate seal of the continuous fastener profiles to the inner surface of the containers, or the extrusion of the continuous fastener profile integral with the container walls.

It is a further object of the present invention to provide flexible reclosable containers which may contain a plurality of sealed compartments so as to package a number of individual products together.

It is an additional object of the present invention to provide prefabricated strips of plastic film having continuous fastener profiles attached thereto so as to facilitate rapid manufacture of flexible reclosable containers at reduced cost.

Other objects, advantages, features and equivalent structures within the scope of the invention will become apparent to those skilled in the art in connection with the teachings of the principles thereof in the specification, claims and drawings.

SUMMARY OF THE INVENTION

The present invention concerns a reclosable flexible container having a plurality of layers of flexible plastic film with continuous fastener profiles attached to the exterior layers of plastic film which interlock through the interior layers of plastic film, thus sealing the container. The container is usually a pouch having a front, back, sides and bottom. A pouch opening at the upper edge of the pouch allows insertion of product. In a preferred embodiment, at least four layers of plastic film are joined together to form the pouch. The pouch is sealed about its periphery on the sides and can be sealed or folded on the bottom.

A first continuous fastener profile is affixed to the first layer of plastic film and extends longitudinally thereon near the pouch opening. A second continuous fastener profile is affixed to the last layer of plastic film and extends longitudinally thereon proximate the pouch opening and in substantial alignment with the first continuous fastener profile. The continuous fastener profiles are constructed and arranged for selective interlocking with the remaining layers of plastic film being interposed therebetween (locked in the continuous fastener profiles), so as to seal the pouch. A variety of types of continuous fastener profiles may be utilized. Generally, however, continuous fastener profiles having one or more ribs extending perpendicularly from a base with a groove formed in the opposing profile are used. The size of the groove and the size of the rib are designed for interlocking with several layers of plastic film being interposed therebetween.

In one embodiment, the container of the present invention includes a cuff formed about the pouch opening with a pair of continuous fastener profiles affixed on the inside walls of the cuff facing each other. The cuff thereby forms the first and last layers of plastic film.

Alternatively, the present invention may encompass a pouch having a single sheet of plastic film with a plurality of horizontal folds dividing the film into a series of compartments. A pair of continuous fastener profiles are affixed on the inside of the exterior layers of plastic film defined by the folds and are positioned for interlocking through the interior layers of plastic film. The compartments may also be of different depths so as to receive a variety of different size products and snugly contain such products therein.

BRIEF DESCRIPTION OF THE DRAWINGS

FIG. 1 of the drawings is a front perspective view of the reclosable flexible container of the present invention.

FIG. 2 of the drawings is a vertical section, partially broken away, taken along line 2—2 of the flexible reclosable container of FIG. 1, showing in particular a pair of flexible cuffs attached to the pouch opening.

FIG. 3 of the drawings is an alternative embodiment of the reclosable flexible container of FIG. 1 showing a pouch having rolled lips formed at the pouch opening with reclosable fasteners contained on the inside walls of the lips, for interlocking through the pouch walls.

FIG. 8 of the drawings is a front perspective view of a prefabricated strip of plastic film having a continuous fastener profile attached thereto.

FIG. 9 of the drawings is a vertical section of an alternative embodiment of the reclosable flexible container of FIG. 1 in which reclosable continuous fastener profiles are affixed to the exterior of the cuff about the pouch opening.

FIG. 10 of the drawings is a vertical section of an alternative embodiment of the reclosable flexible container of FIG. 1 in which one of the reclosable continuous fastener profiles is affixed inside the pouch and a second reclosable continuous fastener profile is affixed to a cuff on the exterior of the pouch.

FIG. 11 of the drawings is a front view of an alternative embodiment of the reclosable flexible container of FIG. 10 in which a reclosable continuous fastener profile is affixed to the inside surface of the cuff on the front of the container and a second mating reclosable continuous fastener profile is affixed to the interior of the container for interlocking with the first fastener profile.

FIG. 12 of the drawings is a vertical section of the reclosable flexible container of FIG. 11.

DETAILED DESCRIPTION OF THE PREFERRED EMBODIMENT

Figure 4:
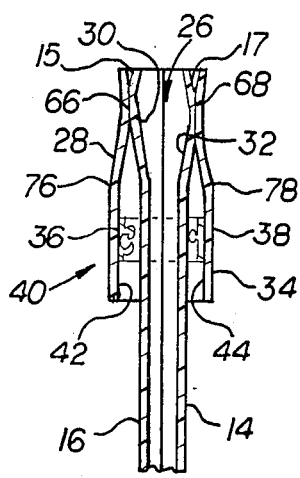
FIG. 4 of the drawings is an alternative embodiment of the flexible reclosable container of FIG. 1 showing in particular cuffs fin sealed to the pouch opening.

While this invention is susceptible of embodiment in many different forms, there is shown in the drawings and will herein be described in detail several specific embodiments with the understanding that the invention is not limited thereto except insofar as those who have the disclosure before them are able to make modifications and variations therein without departing from the scope of the invention.

As best shown in FIG. 1 of the drawings, a reclosable flexible container 10 is provided in the form of a pouch 12. The pouch 12 has a front surface 14, a rear or back surface 16, a right side edge 18, a left side edge 20, a bottom edge 22 and an upper or top edge 24. The pouch 12 has a pouch opening 26 along the top edge 24.

As shown in FIG. 2, the pouch 12 is constructed of four layers 28, 30, 32 and 34 of plastic film. The layers 28 through 34 are sealed together along their right side edge 18 and their left side edge 20. Layers 30 and 32 can also be sealed together along bottom edge 22 or can be folded, as shown in FIG. 1.

A first continuous fastener profile 36 is affixed to the first (outside) layer of plastic film 28 and extends longitudinally thereon near pouch opening 26 and in parallel thereto. A second continuous fastener profile 38 is affixed to the fourth (outside) or last layer 34 of plastic film and extends longitudinally thereon proximate the pouch opening 26 and in parallel thereto. The second continuous fastener profile 38 is parallel to and in substantial alignment with the first continuous fastener profile 36. The first and second continuous fastener profiles 36 and 38 are constructed for selective interlocking with the remaining inside layers 30 and 32 of plastic film being interposed therebetween so as to seal the pouch 12. An example of such interlocking continuous fastener profiles 36 and 38 can be seen in U.S. patent application Ser. No. 796,632, the parent application of the present invention, which is hereby incorporated by reference.

As seen in FIGS. 1 through 5, the pouch 12 may include a cuff 40 about the periphery of the pouch opening 26. As shown in FIGS. 2 through 5, the first continuous fastener profile 36 is affixed to the interior 42 of the cuff 40 along the rear wall 16 of the pouch 12 and in alignment with the pouch opening 26. The second continuous fastener profile 38 is affixed to the interior surface 44 of the cuff 40 along the front wall 14. The first continuous fastener profile 36 and the second continuous fastener profile 38 are aligned with each other and are constructed for interlocking with the second layer 30 and third layer 32 (front wall 14 and rear wall 16) being interposed therebetween for sealing of the pouch 12. As shown in FIG. 3 of the drawings, the cuff 40 may comprise a rolled lip 54 affixed to and extending from the front wall 14 and affixed to and extending from the rear wall 16.

As shown in FIG. 3, the first continuous fastener profile 36 includes a rib 46 extending perpendicularly therefrom. The second continuous fastener profile 38 similarly may include a rib 48. The first and second continuous fastener profiles 36 and 38 each also include a groove, grooves 50 and 52 respectively. Thus, the rib 48 is inserted into the groove 50 with the front wall 14 and the back wall 16 being interposed therebetween. Front and back walls 14 and 16 are sufficiently flexible and the grooves 50 and/or 52 are sufficiently large to hold the ribs 46 and 48, and the front and back walls 14 and 16 and to lock them together.

The cuff 40 is constructed of flexible polymeric material such as polyethylene or polypropylene having a greater thickness than the front wall 14 or the rear wall 16 so as to provide increased stiffness of the pouch opening 26, thereby facilitating insertion of the users fingers into the pouch opening 26, and consequently opening of the pouch 12. In one embodiment, the cuff 40 may be constructed of 10 mil polyethylene whereas pouch 12 may be constructed of 1 mil polyethylene. As a result, significant cost savings in material may be effected. In addition, pouch 12 may be constructed of a laminated film of two or more layers such as those used in food packaging. Examples include laminates of polyvinylidene chloride (Saran ®) and polyethylene or polyethylene and foil, used to provide greater barrier protection. A homogeneous polyethylene cuff may then be sealed to the laminated structure, provided the laminate is polyethylene coated on both sides or has a layer of polyethylene on both sides.

In a preferred embodiment, the cuff 40 is heat sealed to the pouch 12 proximate the pouch opening 26 and is substantially in alignment therewith. The cuff 40 may be constructed of a stiffer material such as polypropylene or other films so as to facilitate opening of pouch 12. A variety of other known methods may also be utilized for stiffening the cuff 40 such as including ribs in the cuff.

As further shown in FIG. 2, cuff 40 has an upper longitudinal edge, 40A, attached to front wall 30 and rear wall 32, respectively, at pouch opening 26. As seen in FIG. 1, cuff 40 has lateral edges 40B and 40C sealed on the respective sides 18 and 20, of the pouch 14. The lower longitudinal edge, 40D, is substantially unattached to front wall 30 and rear wall 32, as seen in FIG. 2.

It should be further noted that in the embodiments shown in FIGS. 1 through 5 the cuff 40 comprises the first layer of plastic film 28 and the fourth layer of plastic film 34. Obviously, alternative embodiments are envisioned in which different numbers of layers of plastic film may be utilized.

Figure 6:
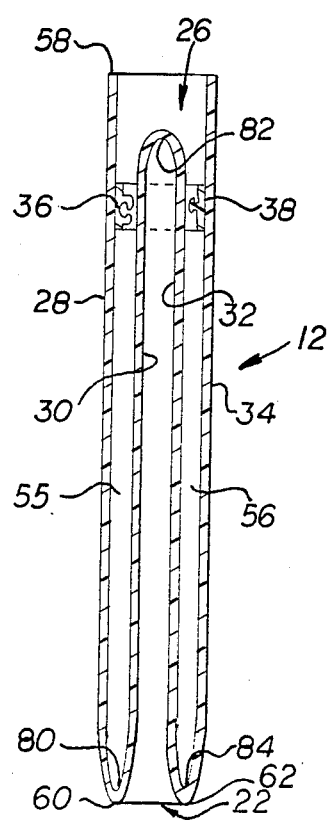
FIG. 6 of the drawings is a vertical section of an alternative embodiment of the reclosable flexible container of FIG. 1 showing in particular a pouch having a pair of compartments formed from a single sheet of flexible film.
Figure 7:
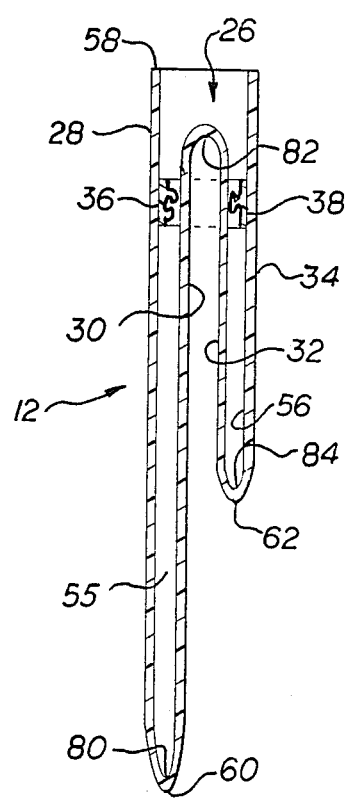
FIG. 7 of the drawings is a vertical section of an alternative embodiment of the reclosable flexible container of FIG. 6 showing compartments of unequal size formed from a single sheet of flexible film.

Turning now to FIGS. 6 and 7, in an additional alternative embodiment of the invention, the first layer 28 and the second layer 30 of plastic film may be sealed together about their sides 18 and 20 (FIG. 1) and joined at their bottom 22 so as to form a first sealed compartment 54 which is sealed on three sides, or on two sides and folded at the bottom. Similarly, the third layer 32 and the fourth layer 34 of plastic film are sealed by conventional heat sealing means along their right side 18 and their left side 20 (FIG. 1) and are joined at their bottom 22. The pouches 12 in both FIGS. 6 and 7 are formed of a continuous sheet of plastic film 58. When the first continuous fastener profile 36 and the second continuous fastener profile 38 are interlocked, the second layer of plastic film 30 and the third layer of plastic film 32 are interposed therebetween so as to seal the first compartment 54 and the second compartment 56. In the embodiments shown in FIGS. 6 and 7 pouch 12 has two bottom edges, a bottom edge 60 of first compartment 54 and a bottom edge 62 of second compartment 56.

As further shown in FIGS. 6 and 7 of the drawings, in order to form a first compartment 54 and a second compartment 56, a plurality of horizontal folds are provided. Specifically, a first horizontal fold 80 divides the first layer 28 from the second layer 30. The first horizontal fold 80 is positioned proximate bottom edge 60. A second horizontal fold 82 divides the second layer 30 from the third layer 32 and is positioned proximate the pouch opening 26, with the second horizontal fold 82 positioned above the first continuous fastener profile 36 and the second continuous fastener profile 38 so that the second layer 30 and the third layer 32 are interposed between the continuous fastener profiles. The third horizontal fold 84 is disposed between the third layer 32 and the fourth layer 34 so as to form a second compartment 56. As a result, the first continuous fastener profile 36 and the second continuous fastener profile 38 may be interlocked with the second layer of plastic film 30 and the third layer of plastic film 32 interposed and engaged in the continuous fastener profiles.

In an alternate embodiment of pouch 12, first compartment 54 may be formed by sealing together first layer 28 and second layer 30 along the sides and bottom thereof. Second compartment 56 may be formed by sealing third layer 32 and fourth layer 34 together along their sides and bottom. The first and second compartment 54 and 56 are sealed together with the fastener profiles affixed thereto.

As shown in FIG. 7 of the drawings, in one embodiment the first sealed compartment 54 may be larger in size than the second sealed compartment 56 for tightly containing two different products of different sizes. For example, a sandwich may be packaged in the first compartment 54, and a pickle, cole slaw or potato salad in the second compartment 56. Similarly, a third compartment may be provided (not shown) in which an additional condiment for food packaging may be contained.

Figure 5:
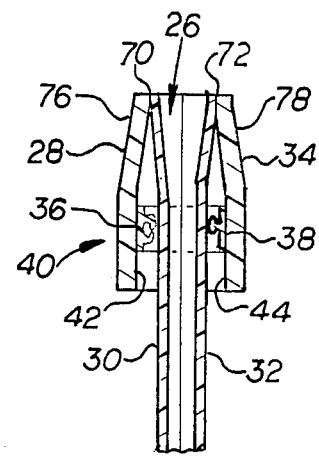
FIG. 5 of the drawings is a vertical section of an alternative embodiment of the reclosable flexible container of FIG. 1 showing in particular thickened cuffs slit sealed to the pouch opening.

In the embodiment shown in FIG. 4, the cuff 40 is fin sealed to the front wall 14 at fin seal 66 and the back wall 16 at fin seal 68 about the periphery of pouch opening 26. Fin sealing, as commonly known in the art, utilizes either a bar sealer or a roller which provides a fairly wide seal but does not cut the film. Alternatively, as seen in FIGS. 2 and 5, the cuff 40 may be slit sealed to the front wall 14 at slit seal 72 and the rear wall 16 at slit seal 70 about the periphery of the pouch opening 26. As is commonly known in the art, slit sealing utilizes a wire, preferably of nichrome alloy, which is heated so as to cut and seal the film at the same time. Fin seals 66 and 68 are shown in FIG. 4 and slit seals 70 and 72 are shown in FIGS. 2 and 5.

As shown in FIG. 8, in order to fully utilize the advantages of the present invention, the cuff 40 may be constructed of a single strip 64 of plastic film. The prefabricated strip 64 may be manufactured either by slitting existing film and sealing a continuous fastener profile 74 longitudinally along the film, or by coextruding a sheet of film having a fastener strip integrally formed thereon. As shown in FIG. 5, a first section 76 of such prefabricated strip may be slit sealed to the exterior of the front surface 14 with the continuous fastener profile 36 facing the second layer 30 of plastic film. Similarly, a second fabricated strip 78 may be slit sealed to the exterior of the rear surface 16 with the second continuous fastener profile 38 facing first continuous fastener profile 36. The use of prefabricated strips 64 increases the manufacturing speed of the pouch 12 and thereby reduces the cost. In addition, the use of prefabricated strips allows the cuff 40 to be constructed of a thicker or stiffer material than pouch walls 14 and 16 so as to stiffen the pouch opening 26. It should be noted that although prefabricated strip 64 is shown as having a single continuous fastener profile 74, prefabricated strip 64 may be manufactured having two or more fastener profiles thereon. As a result pouch 12 may be manufactured two at a time (two up) or in other multiples if desired.

Turning now to FIG. 2, in one embodiment, the rear surface 16 extends above the front surface 14 proximate the pouch opening 26. As a result, the front surface 14 may be more easily separated from the rear surface 16 when opening pouch 12. The use of such differentiated heights between the front and rear walls of the pouch is accomplished by folding a single sheet of film along the bottom edge 22 but not uniformly, so that the rear surface 16 is longer than the front surface 14 in the vertical dimension. This aspect of the invention may be utilized not only for reclosable flexible containers having cuffs, but for many other reclosable pouches.

As further shown in FIG. 10 of the drawing, it may in some instances be desirable for one of the continuous fastener profiles to be contained within the pouch and for a second continuous fastener profile to be affixed to a cuff extending along one wall of the exterior of the pouch. Thus, first continuous fastener profile 36 is affixed to exterior cuff 40 on front wall 14 of pouch 12. However, a second continuous fastener profile 38 is affixed to the interior surface of front wall 16 of pouch 12. The continuous fastener profiles may then be interlocked with rear wall 16 interposed therebetween. Obviously the reverse positioning of the fastener profiles may also be utilized.

As shown in FIG. 9 of the drawings, it may also be desirable in some circumstances to have the continuous fastener profiles affixed to the exterior surface of cuff 40. In such instance, the fastener profiles 36 and 38 are sealed on their ends proximate sides 18 and 20, as described in U.S. patent application Ser. No. 796,632, the parent to the present application. In order to seal pouch 12 fastener profiles 36 and 38 are interlocked, with all four layers of plastic film engaged within the profiles.

As seen in FIGS. 11 and 12, in an alternative embodiment of the invention of FIG. 10, first layer 28 of flexible film is rolled over proximate pouch opening 26 to form a cuff 40. On the inside surface 42 of cuff 40 is first fastener profile 36. A second fastener profile 38 is attached to the interior surface of second layer 30 of flexible film. In the embodiment shown, second layer 30 has a vertical flange 80 extending upwardly above pouch opening 26. Through the use of cuff 40 and vertical flange 80, opening of pouch 12 is facilitated. Specifically, the user may grasp cuff 40 with the fingers of one hand and vertical flange 80 with the fingers of the other hand and pull to separate them apart, thus separating reclosable fasteners 36 and 38 and opening pouch 12.

The foregoing description and drawings merely explain and illustrate the invention and the invention is not limited thereto except in so far as those that have the disclosure before them are able to make modifications and variations therein without departing from the scope of the invention.

What is claimed is:

1. A reclosable flexible container comprising:
   a pouch having front and back walls, and a pouch opening at the upper edge thereof, said pouch having a cuff extending downwardly from said pouch opening onto the exterior of said front and back walls and circumscribing said pouch opening, said cuff having an upper longitudinal edge attached to said front and rear walls, lateral edges sealed on the respective sides of said pouch, and a lower longitudinal edge substantially unattached to said front and rear walls;
   a first continuous fastener profile affixed to the interior of said cuff along said rear wall of said pouch and extending longitudinally thereon proximate said pouch opening and in alignment therewith; and
   a second continuous fastener profile affixed to the interior of said cuff along said front wall of said pouch in an alignment with said first continuous fastener profile, said continuous fastener profiles being constructed and arranged for selective interlocking with said front and rear walls of said pouch interposed therebetween.

2. The flexible reclosable container of claim 1 wherein said rear wall of said pouch extends above said front wall of said pouch so as to facilitate separation of said front wall from said rear wall when opening said pouch.

3. The reclosable flexible container of claim 1 wherein said pouch comprises a laminated film of at least two layers.

4. The flexible reclosable container of claim 1 wherein said cuff comprises a front lip affixed to said front wall of said pouch.

5. The flexible reclosable container of claim 1 wherein said cuff is constructed of a flexible polymeric material having a thickness substantially greater than the thickness of said front wall or said rear wall of said pouch so as to provide increased stiffness to said pouch opening, thereby facilitating digital manipulation and opening of said pouch.

6. The flexible reclosable container of claim 1 wherein said cuff is heat sealed to said pouch proximate said pouch opening and substantially in alignment therewith.

7. The flexible reclosable container of claim 1 wherein said cuff comprises a first thermoplastic material and said front and back walls of said pouch comprise a second thermoplastic material, said first thermoplastic material being stiffer than said second thermoplastic material so as to stiffen said pouch opening thereby facilitating opening and closing of said pouch.

8. The flexible reclosable container of claim 1 wherein said cuff is stiffer than said front and back walls of said pouch thereby stiffening said pouch opening so as to facilitate opening and closing of said pouch.

9. The reclosable flexible container of claim 1 wherein said first continuous fastener profile comprises a base portion and a groove portion, said base portion being affixed to the interior of said cuff across substantially its entire length and said groove portion being substantially unattached to said cuff; and
   said second continuous fastener profile comprises a base portion and a rib portion, said base portion being affixed to said cuff across substantially its entire length and said rib portion being substantially unattached to said cuff;
   said rib and groove being disposed in facing mating substantially parallel position so as to interlock when pressed together with said front and back wall of said pouch being interposed therebetween.

10. The flexible reclosable container of claim 1 wherein said cuff comprises a portion of said front wall folded over itself and a portion of said rear wall folded over itself, said cuff circumscribing said pouch opening.

11. The flexible reclosable container of claim 1 wherein said cuff comprises a first strip of plastic film sealed to said rear wall and a second strip of plastic film sealed to said front wall of said pouch, said first and second strips of plastic film circumscribing said pouch opening.

12. The flexible reclosable container of claim 11 wherein said cuff is fin sealed to said front wall and said back wall of said pouch about the periphery of said pouch opening.

13. The flexible reclosable container of claim 11 wherein said cuff is slit sealed to said front wall and said back wall of said pouch about the periphery of said pouch opening.

14. The flexible reclosable container of claim 1 wherein said cuff comprises a first prefabricated strip of plastic film and continuous fastener profile sealed to the exterior of said rear wall of said pouch, and a second prefabricated strip of plastic film and continuous fastener profile sealed to the exterior of said front wall of said pouch, said cuff facilitating manufacture of said container.

* * * * *